United States Patent
Puglisi

(10) Patent No.: US 10,926,877 B1
(45) Date of Patent: Feb. 23, 2021

(54) RETRACTABLE PORTABLE ELECTRONIC DEVICE HOLDER

(71) Applicant: Rockwell Collins, Inc., Cedar Rapids, IA (US)

(72) Inventor: Stephen A. Puglisi, Greensboro, NC (US)

(73) Assignee: Rockwell Collins, Inc., Cedar Rapids, IA (US)

(*) Notice: Subject to any disclaimer, the term of this patent is extended or adjusted under 35 U.S.C. 154(b) by 35 days.

(21) Appl. No.: 16/216,011

(22) Filed: Dec. 11, 2018

Related U.S. Application Data

(63) Continuation-in-part of application No. 16/151,178, filed on Oct. 3, 2018, now abandoned.

(51) Int. Cl.
*B64D 11/00* (2006.01)
*B64D 11/06* (2006.01)

(52) U.S. Cl.
CPC .. *B64D 11/00152* (2014.12); *B64D 11/00155* (2014.12); *B64D 11/0605* (2014.12); *B64D 11/0627* (2014.12)

(58) Field of Classification Search
CPC .......... B64D 11/00152; B64D 11/0638; B64D 11/06; B60N 3/004; B60N 3/002; B60N 3/106; B60N 3/108; B60R 2011/0015; B60R 2011/0082
See application file for complete search history.

(56) References Cited

U.S. PATENT DOCUMENTS

| | | | |
|---|---|---|---|
| 8,210,605 B2 | 7/2012 | Hough et al. | |
| 8,424,825 B2* | 4/2013 | Somuah | B60R 11/0235 248/130 |
| 8,561,863 B2* | 10/2013 | LaColla | B60R 11/02 224/275 |
| 8,667,904 B2 | 3/2014 | Pajic | |
| 8,826,830 B2 | 9/2014 | Pajic | |
| 9,067,682 B2 | 6/2015 | Pajic | |
| 9,167,905 B2 | 10/2015 | Pajic | |
| 9,168,876 B2 | 10/2015 | Pajic | |
| 9,242,733 B2 | 1/2016 | Pajic | |
| 9,403,596 B2 | 8/2016 | Pajic | |
| 9,409,647 B2 | 8/2016 | Pajic | |
| 9,481,465 B2 | 11/2016 | Pajic | |
| 9,623,971 B2 | 4/2017 | Pajic | |
| 9,701,234 B2 | 7/2017 | Pajic | |
| 10,029,793 B2* | 7/2018 | Pozzi | B64D 11/0605 |
| 10,220,795 B2* | 3/2019 | Osterhoff | B60N 2/90 |
| 10,220,796 B2* | 3/2019 | Neumann | B64D 11/00152 |
| 2011/0101195 A1* | 5/2011 | Skolnik | A47B 23/04 248/446 |
| 2012/0235001 A1* | 9/2012 | Somuah | B60R 11/0235 248/287.1 |

(Continued)

*Primary Examiner* — Shin H Kim
(74) *Attorney, Agent, or Firm* — Suiter Swantz pc llo

(57) ABSTRACT

An apparatus and method for securely holding a Portable Electronic Device (PED). The PED holder is integrated with furniture viewable by a potential user and configured with a support structure couplable to an existing portion of the furniture. The support structure holds a retractable, spring-loaded extension member biased for retraction. Empty, the extension member automatically retracts proximal with the housing of the support structure. Extended, with a PED in place, the retraction bias allows for securely clamping a plurality of sizes of PED.

12 Claims, 23 Drawing Sheets

(56) References Cited

U.S. PATENT DOCUMENTS

| | | | |
|---|---|---|---|
| 2012/0248833 A1 | 10/2012 | Hontz et al. | |
| 2014/0054430 A1* | 2/2014 | Jacobson | F16M 11/041 |
| | | | 248/295.11 |
| 2015/0034796 A1* | 2/2015 | Jones | F16M 13/00 |
| | | | 248/558 |
| 2015/0108317 A1* | 4/2015 | Cruz | F16M 11/08 |
| | | | 248/479 |
| 2015/0175265 A1 | 6/2015 | Thiele et al. | |
| 2016/0009294 A1 | 1/2016 | Felske et al. | |
| 2016/0355263 A1 | 12/2016 | Pozzi et al. | |
| 2016/0374215 A1* | 12/2016 | Danicich | F16C 11/04 |
| 2018/0072424 A1* | 3/2018 | Irons | B60R 11/0252 |

* cited by examiner

1202: mounting a support structure one of: proximal with a seat back and a on seat back monitor, the support structure including a housing and a mounting assembly, the housing including a retraction spring mechanism 1204: coupling an extension member with the housing, the extension member 1) translationally coupled with the housing, 2) operatively coupled with the retraction spring mechanism, and 3) biased for retraction proximal to the housing, the retraction spring mechanism causing the retraction bias, the extension member including a support shelf attached to an end of the extension member distant from the housing, the support shelf configured to clamp the PED between the support shelf and the housing 1206: wherein the housing is configured to translationally receive the extension member

RETRACTABLE PORTABLE ELECTRONIC DEVICE HOLDER

CROSS-REFERENCE TO RELATED APPLICATIONS

The present application is a continuation-in-part (CIP) and claims the benefit under 35 U.S.C. § 120 of U.S. Non-Provisional patent application Ser. No. 16/151,178 filed Oct. 3, 2018, entitled "RETRACTABLE PORTABLE ELECTRONIC DEVICE HOLDER" the contents of which are herein incorporated by reference in their entirety.

BACKGROUND

A passenger may desire access to a Portable Electronic Device (PED) during travel. At times, the passenger may require both hands to complete a task and still desire access to the PED.

Current seat tray tables may be insufficient for securing the PED during travel. Also, the PED located on the tray table may displace other items the passenger may desire to place on the tray table. In addition, a tray table mounted PED holder may function to place the PED in jeopardy where the PED may be subject to damage should the forward seat recline.

A dedicated PED holder may not be desirable since it may impede other functions of the seat back (e.g. display, tray table, seat pocket). Currently, there are no PED holder options allowing a single-piece tray table while being able to stow the tray table and still operate/view the PED. Some PED holders may mount directly beneath a video monitor. However, a bi-fold tray table is required because there isn't enough space for a single-piece tray table. Current PED holders may be fixed and don't allow the occupant to adjust their viewing angle.

Therefore, a need remains for a PED holder retractable in configuration to allow access to additional function within the seat back.

SUMMARY

Accordingly, an apparatus for retractably receiving a Portable Electronic Device (PED) may comprise a support structure configured for integrating with wither a seat back and/or a passenger monitor. The support structure includes a mounting assembly for mounting within the seat back as well as a housing. The housing may include a retraction spring coupled with an extension member.

The extension member translates from a retracted position proximal with the housing to an extended position away from the housing. The retraction spring may couple with one or more sections of the extension member to bias the extension member and/or sections thereof for retraction proximal to the housing. The extension member may be configured for clamping the PED between a support shelf attached to a distal end of the extension member and the housing.

In one embodiment of the inventive concepts disclosed herein, a method for retractably receiving a PED may comprise mounting a support structure within a seat back and/or on a seat back monitor. Here also, the support structure may include a housing configured to receive an extension member and a mounting assembly configured for mounting the support structure to a desired location.

The method may include coupling an extension member translationally with the housing and biased for retraction proximal to the housing. As before, the extension member may be operatively coupled with a retraction spring where the retraction spring may cause the retraction bias. In embodiments, the extension member may include a support shelf attached to a distal end of the extension member from the housing. In operation, the method clamps the PED between the support shelf and the housing via the retraction bias.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIG. 12 is a flowchart of a method for retractably receiving a PED exemplary of one embodiment of the inventive concepts disclosed herein.

DETAILED DESCRIPTION OF EXEMPLARY EMBODIMENTS

Figure 1:
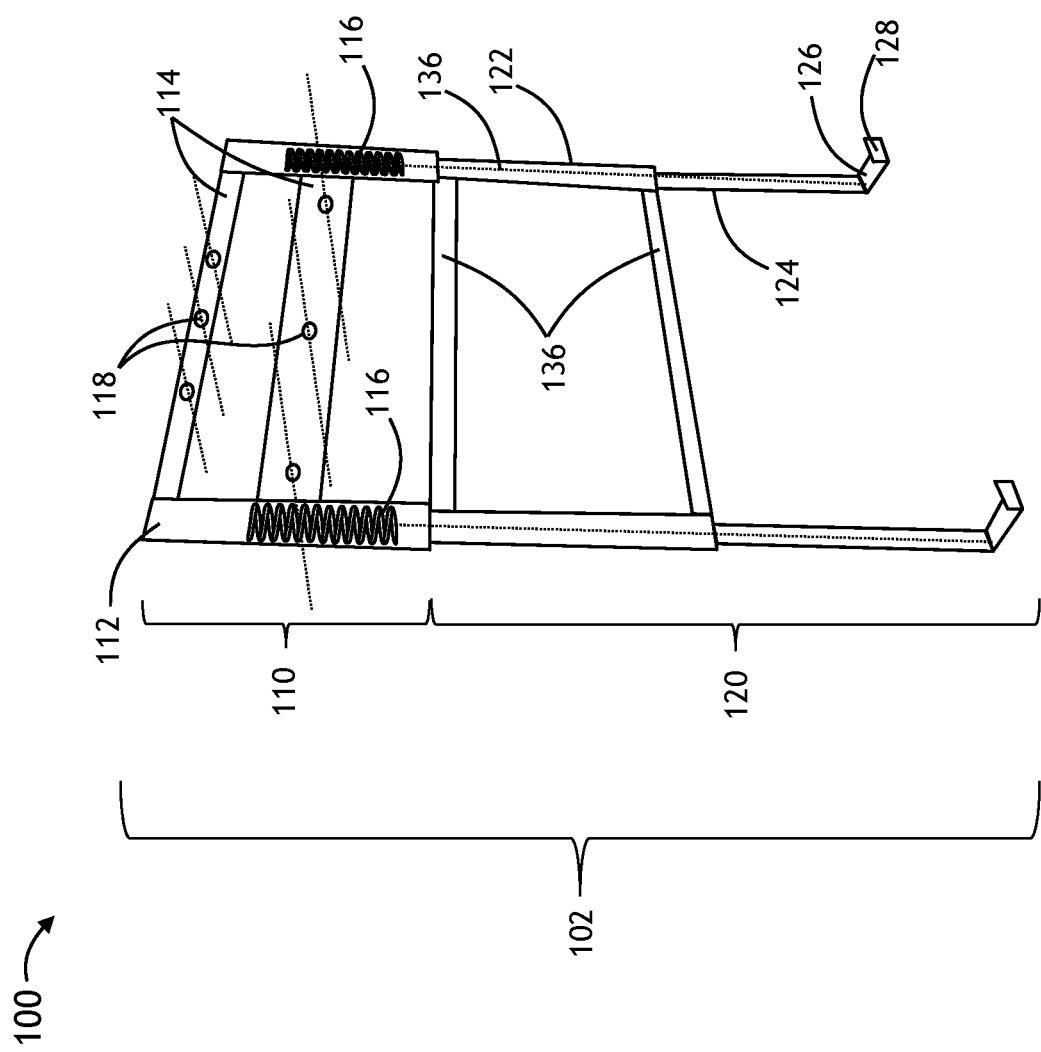
FIG. 1 is a diagram of an extended PED holder in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to apparatus and method for securely holding a Portable Electronic Device (PED). The PED holder is integrated with furniture viewable by a potential user and configured with a support structure couplable to an existing portion of the furniture. The support structure holds a retractable, spring-loaded extension member biased for retraction. Empty, the extension member automatically retracts proximal with the housing of the support structure. Extended, with a PED in place, the retraction bias allows for securely clamping a plurality of sizes of PED.

| Reference Chart | |
| --- | --- |
| 100 View of extended PED Holder | 236 First Spring Connector |
| 102 Retractable PED Holder | 300 View of extended PED Holder |
| 110 Support Structure | 400 View of mounted PED |
| 112 Housing | 416 Second Retraction Spring |
| 114 Mounting Assembly | 436 Second Retraction Connector |
| 116 Retraction Spring | 436 Second Spring Connector |
| 118 Mounting Assembly Orifice | 500 View of PED Holder and Tray Table |
| 120 Extension Member | 600 View of PED Holder and Tray Table |
| 122 First Extendable Section | 700 Perspective view of PED Holder |
| 124 Second Extendable Section | 710 Seat Armrest |
| 126 Support Shelf | 730 Front Row Personal Monitor |
| 128 Support Shelf Lip | 732 Monitor Arm |
| 134 Cross Members | 750 Extension Direction |
| 136 Spring Connector | 752 Retraction Direction |
| 140 PED | 800 Side view of PED Holder |
| 200 View of retracted PED Holder | 824 Induction Charger |
| 210 Passenger Seat | 900 Front View of PED Holder |
| 216 First Retraction Spring | 910 Rails |
| 220 Tray Table | 912 Shroud |
| 222 Tray Table Attachment | 922 First Rollers |
| 226 Pull Tab | 924 Second Rollers |
| 230 Personal Monitor | 926 Proximal Hook |
| 236 First Retraction Connector | 930 Monitor Tilt Bracket |
| 932 Monitor Pivot Attachment | 1100 Rear View of PED Holder |
| 1000 Side View of PED Holder | 1200 Flowchart |

Referring now to FIG. 1, a diagram of an extended PED holder in accordance with an embodiment of the inventive concepts disclosed herein is shown. The retractable PED holder 102 may include a support structure 110 and an extension member 120. The support structure 110 may include a housing and a mounting assembly 114. Associated with the housing 112, the retractable PED holder 102 may also include a retraction spring 116 coupled with each of the housing 112 and the extension member 120.

Associated with the support structure 110, the retractable PED holder 102 may further include mounting assembly 114 as well as mounting assembly orifice 118 to couple the retractable PED holder 102 with a desired structure.

The extension member 120 may be translationally coupled with the housing and biased for retraction proximal to the housing. A user may physically pull the extension member 120 from the housing overcoming the retraction bias to remove the extension member 120 from the housing. Once the user discontinues an application of force, the retraction spring 116 acts on the extension member 120 to retract the extension member 120 within, or proximal with, the housing 112.

Attached to a distal end of the extension member 120, a support shelf 126 may be attached to support the PED. Acting as a clamp, the extension member 120 may secure the PED between the support shelf 126 and the housing 112.

In one embodiment of the inventive concepts disclosed herein, the extension member 120 may be comprised of a pair of parallel arms. One or both of the parallel arms may extend to clamp the PED in place. Depending on a size of the desired PED, a single arm may be extended by the user to clamp the PED in place. A larger PED may require both arms to extend to clamp the large PED in place.

In one embodiment of the inventive concepts disclosed herein, the extension member 120 may comprise a two-stage extension member including a first extendable section 122 and a second extendable section 124. Here, the first extendable section 122 may be translationally coupled with the housing 112 and the second extendable section 124 may be translationally coupled with the first extendable section 122 and the retraction spring 116 via the spring connector 136. In this embodiment, the second extendable section 124 includes the support shelf 126 and optionally, a support shelf lip 128.

In embodiments, the support shelf 126 may be angled sufficiently with respect to the extension member 120 to enable secure clamping of the mounted PED. In some embodiments, the support shelf 126 may maintain a 90-degree angle relative to the extension member 120 whereas additional acute angles may also operate to securely clamp the PED in place without the need for a support shelf lip 128.

In one embodiment of the inventive concepts disclosed herein, the first extendable section 122 may further include one or more cross member 134 for additional structural strength. Each cross member 134 may function to stabilize both the first 122 and second 124 extendable sections for additional PED stability when mounted.

In operation of the two-stage embodiment, each of the first 122 and second 124 extendable sections may be configured for retraction proximally within, and extension distally from, the housing 112. The user may apply force to the support shelf overcoming the retraction bias thereby extending the second extendable section 124 and optionally the first extendable section 122 from the housing 112.

In retraction, the second extendable section 124 of the extension member 120 may retract within or adjacent to the first extendable section 122 and both the first 124 and second 122 extendable sections may then retract within or adjacent to the housing 112. In one embodiment, the housing 112 is cylindrical with a hollow center and each of the first extendable section 122 and second extendable section 124 is circular. The first extendable section 122 being cylindrical and hollow to accommodate the second extendable section 124 where the second extendable section 124 retracts within the first extendable section 122 and then both first 122 and second 124 extendable sections retract within the hollow housing 112.

Each housing 112 may also include the retraction spring 116 coupled with to the second extendable section 124 via the spring connector 136. In this manner the retraction spring 116 may act upon the support shelf 126 or second extendable section 124 causing the first extendable section 122 and second extendable section 124 to retract within the housing 112. A retraction limit may be naturally limited by the support shelf impacting the housing 112.

In extension, the PED holder 102 may be extended manually by a user acting upon the support shelf 126 and/or the support shelf lip 128. In this manner, the user may extend one or both of the first and or second extendable sections 122 124, and/or one or both of the first 122 and second extendable sections, place the user's PED on one or both of the support shelf 126 (depending on PED size), then allow the arm(s) to retract to clamp the PED in place. In addition, depending on PED size, the user may opt to extend a single side of the second extendable section 124 to an extended length to accommodate a phone sized PED. In this manner, the smaller PED may be held in place via the spring bias of the desired side to which the smaller PED is mounted.

FIG. 2

Figure 2:
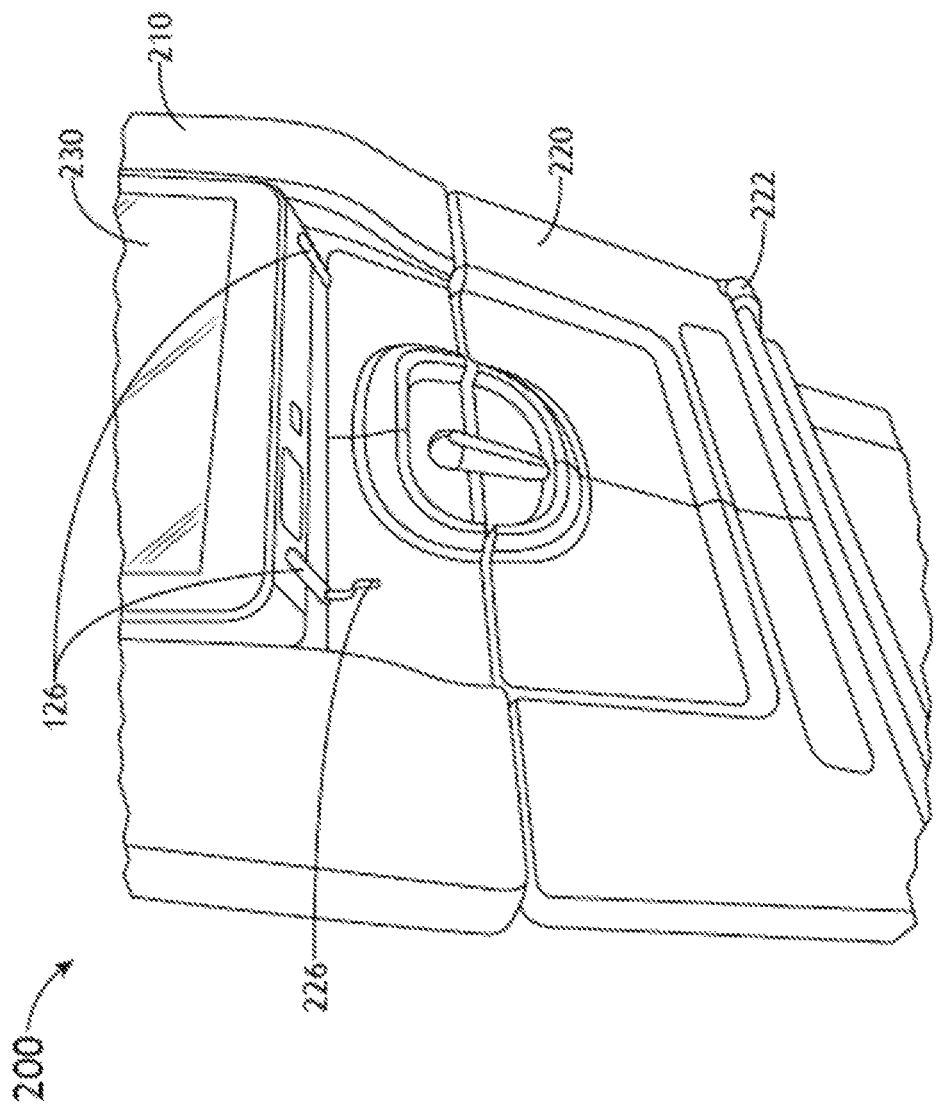
FIG. 2 is a diagram of a retracted PED holder in accordance with an embodiment of the inventive concepts disclosed herein.

Referring now to FIG. 2, a diagram of a retracted PED holder in accordance with an embodiment of the inventive concepts disclosed herein is shown. In one embodiment of the inventive concepts disclosed herein, the retractable PED holder 102 may be configured for integrating with a seat back of a passenger seat 210 as well as associated with a personal monitor 230 installed within the passenger seat 210.

The retractable PED holder 102 may be incorporated proximal with a seat back of a passenger seat 210. With or without a personal monitor 230, the retractable PED holder 102 may operate to secure the PED in a location viewable by the user. In one embodiment, the retractable PED holder 102 may be incorporated proximal with an upper seat cushion within the seat back. In this manner, an operator or manufacturer of a seat may incorporate the retractable PED holder 102 without a personal monitor 230 incorporated with the back of the seat.

Passenger seat 210 may include the personal monitor 230 and a tray table 220 attached to the seat via a tray table attachment 222. In a retracted state, the retractable PED holder 102 may be configured to remain clear of operation of the tray table 220 as the tray table 220 is moved from a stowed position to an extended position and vice versa.

The retractable PED holder 102 may be optionally fitted with an indicator pull tab 226 coupled with one or both of the support shelf 126 to clearly indicate where a user may grasp and pull to extend one or both sides of the retractable PED holder 102. The pull tab 226 may be designed as a discrete option to not interfere with additional seat back function while the retractable PED holder 102 is retracted or extended. In embodiments, the pull tab 226 may be brightly colored to assist in user identification.

FIG. 3

Figure 3:
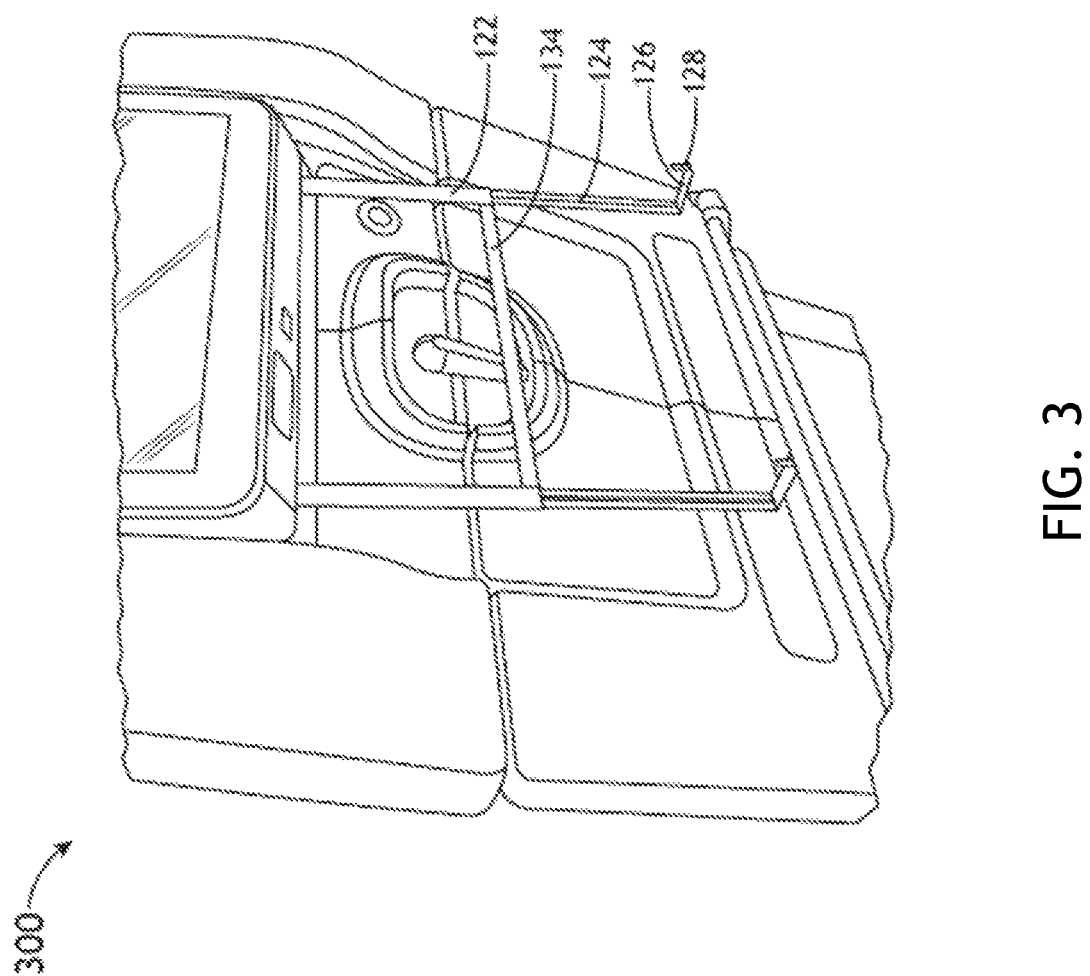
FIG. 3 is a diagram of an extended PED holder exemplary of an embodiment of the inventive concepts disclosed herein.

Referring now to FIG. 3, a diagram of an extended PED holder exemplary of an embodiment of the inventive concepts disclosed herein is shown. In one embodiment, the extension member 120 may comprise the first extendable section 122 comprising a first pair of retractable arms translationally coupled with the support structure 110 and the second extendable section 124 comprises a second pair of retractable arms translationally coupled to the first pair, each single arm of the second pair of retractable arms including the support shelf 126.

In the extended position, the extension member 120 may be fully extended with each of the first 122 and second 124 extendable sections in view. The diagram 300 indicates the retractable PED holder 102 is in position to accept the PED.

Figure 4A:
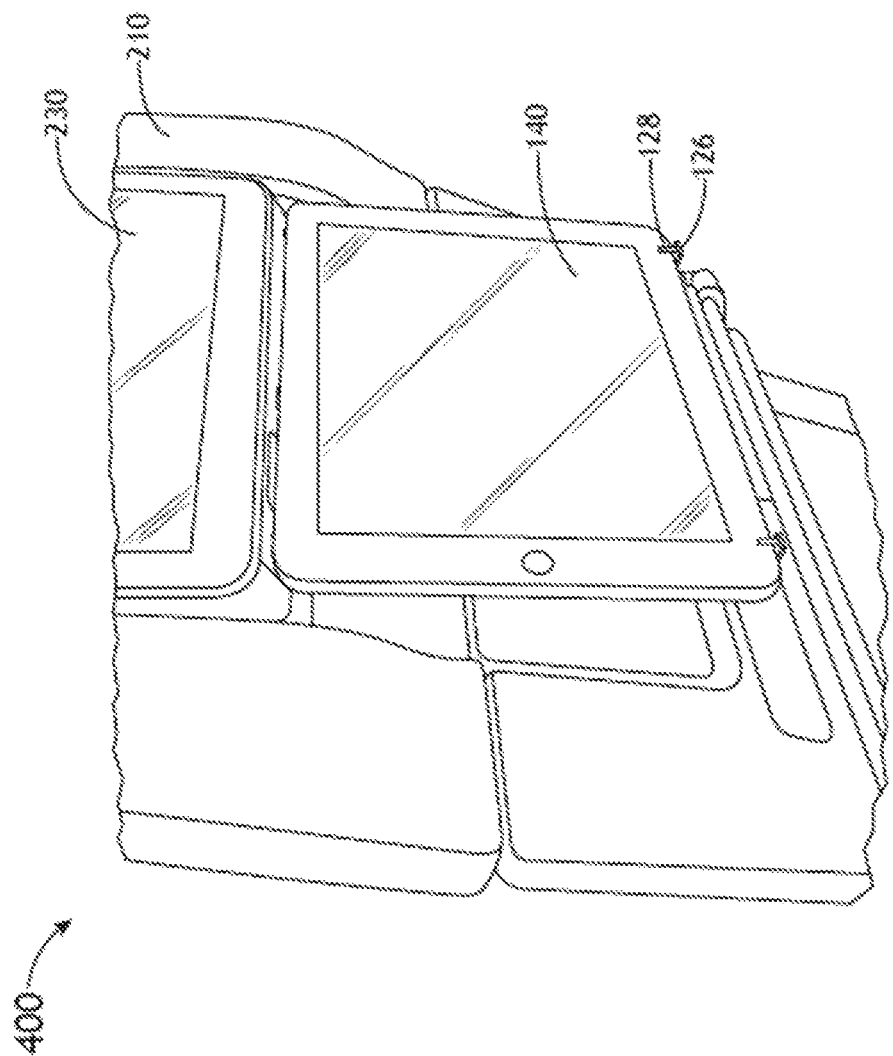
FIGS. 4A and 4B are diagrams of a PED mounted upon the extended PED holder exemplary of one embodiment of the inventive concepts disclosed herein.
Figure 4B:
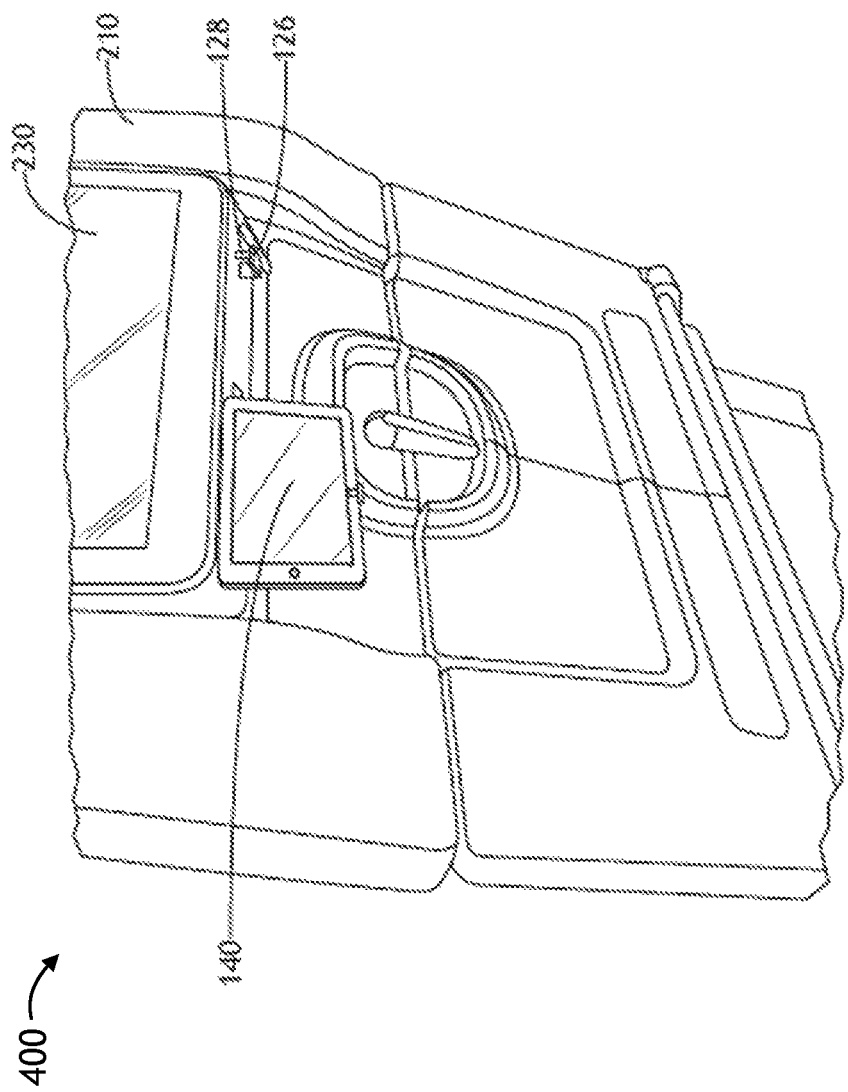

FIGS. 4A and 4B

Referring now to FIGS. 4A and 4B, diagrams of a PED mounted upon the extended PED holder exemplary of one embodiment of the inventive concepts disclosed herein are shown. In one embodiment, FIG. 4A may indicate a full-size PED 140 mounted upon the retractable PED holder 102 while FIG. 4B indicates a smaller phone size PED 140 mounted.

FIG. 5

Figure 5:
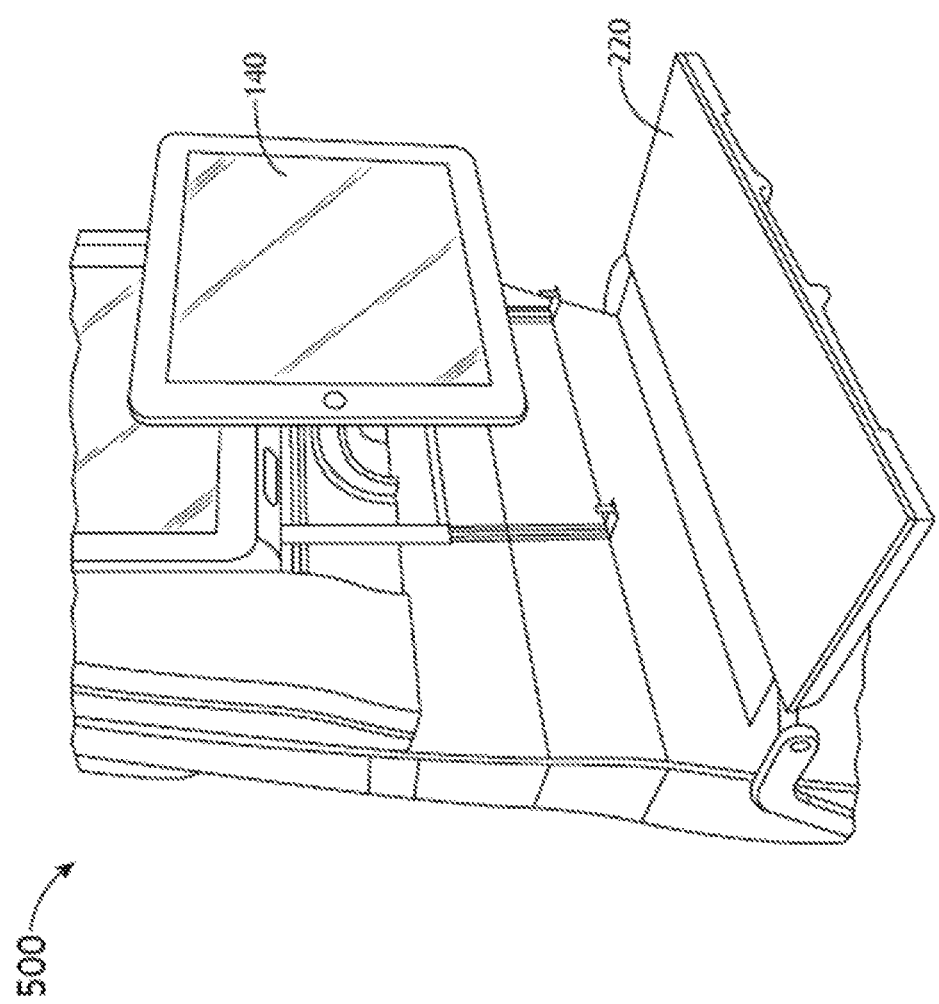
FIG. 5 is a diagram of a PED holder and tray table in accordance with one embodiment of the inventive concepts disclosed herein.

Referring now to FIG. 5, a diagram of a PED holder and tray table in accordance with one embodiment of the inventive concepts disclosed herein is shown. The retractable PED holder 102 coupled with the back of a passenger seat 210 may enable the passenger access to each function of the passenger seat 210 as well as the retractable PED holder 102 if desired. The tray table 220 may be one function of the passenger seat 210 desirable during passenger viewing of the PED 140. The retractable PED holder 102 may enable use of the tray table 220 while the retractable PED holder 102 is in the stowed position. Once the tray table has been lowered, the retractable PED holder 102 may then be extended to enable PED 140 access during, for example, a passenger meal.

In one embodiment of the inventive concepts disclosed herein, an operator of an aircraft may offer a standard sized seat-equipped personal monitor 230, a standard sized single-piece tray table 220, and the retractable PED holder 102 all associated with a rear section of the passenger seat 210. With the retractable PED holder 102 In the retracted position, the passenger may operate the single piece tray table 220 without restriction. Once the tray table 220 is lowered, the passenger may then extend the retractable PED holder 102 to continue to view the PED 140.

In one embodiment, the retractable PED holder 102 may be coupled with the existing seat back personal monitor 230 to mirror the mechanical function of the installed seatback monitor 230. For example, the retractable PED holder 102 may tilt and/or extend with the installed seatback personal monitor 230 to allow the user to adequately position a PED 140 to the desired viewing position.

FIG. 6

Figure 6:
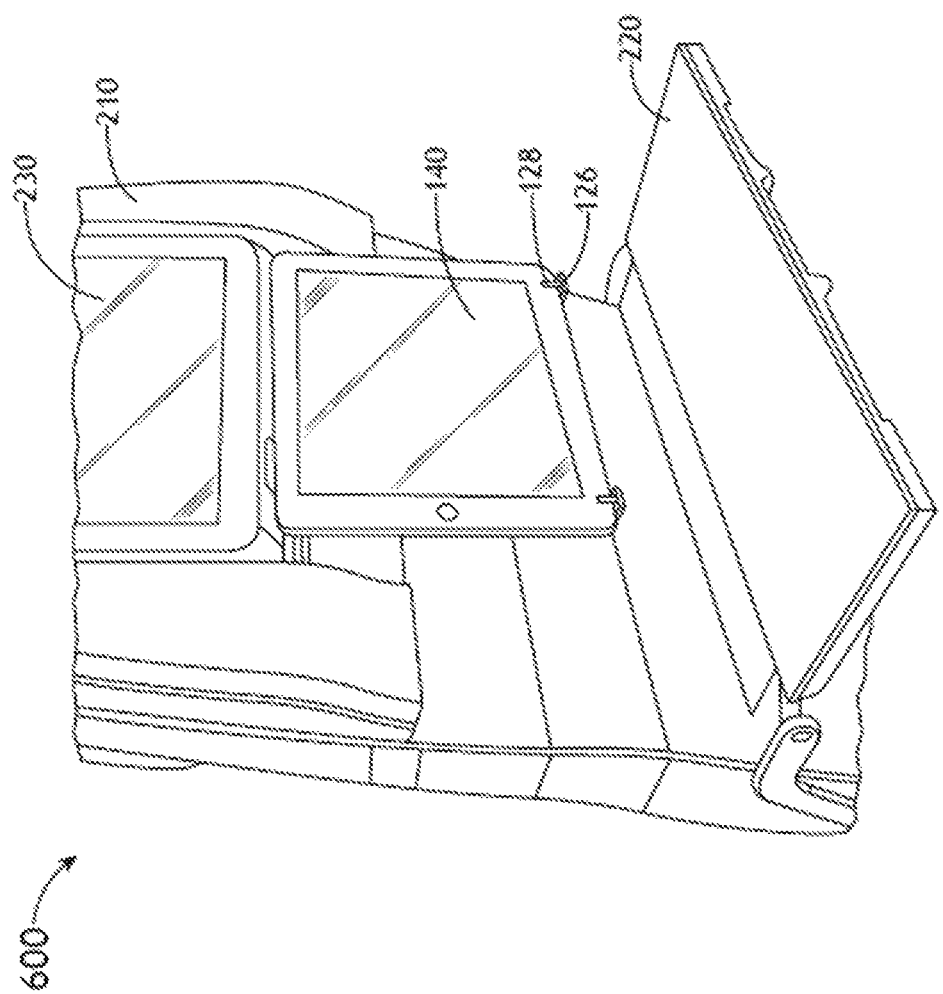
FIG. 6 is a diagram of a mounted PED and tray table extended in accordance with one embodiment of the inventive concepts disclosed herein.

Referring now to FIG. 6, a diagram of a mounted PED and tray table extended in accordance with one embodiment of the inventive concepts disclosed herein is shown.

The user may either have their tray table 220 stowed or deployed while watching the standard seat-equipped personal monitor 230 and the PED 140 simultaneously. Since the retractable PED holder 102 may be coupled with the same tilt as the seat-equipped personal monitor 230, the occupant may have the luxury of tilting the PED 140 to achieve the desired viewing angle.

FIG. 7A-7C

Figure 7A:
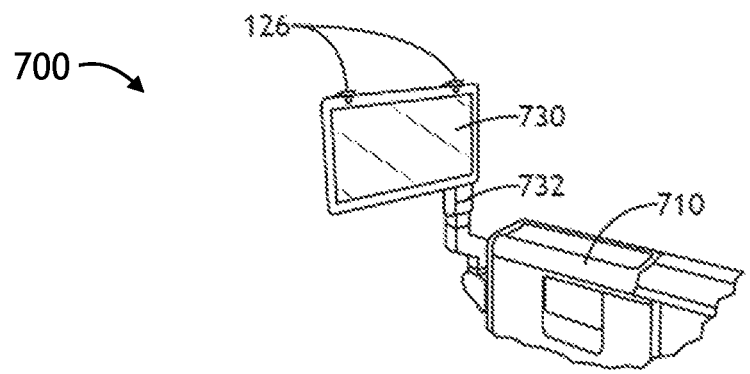
FIG. 7A-7C are diagrams of a PED holder within a front row video monitor associated with one embodiment of the inventive concepts disclosed herein.
Figure 7B:
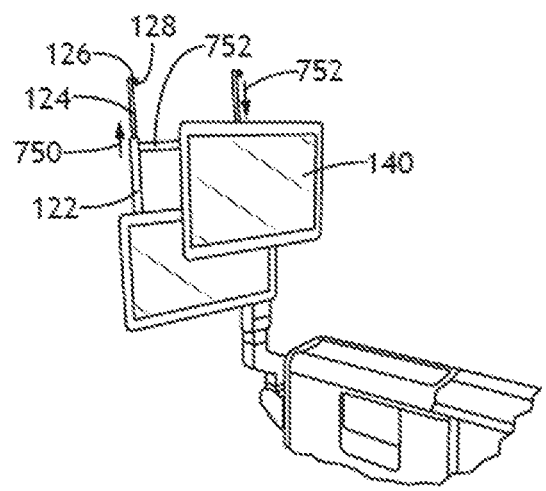
Figure 7C:
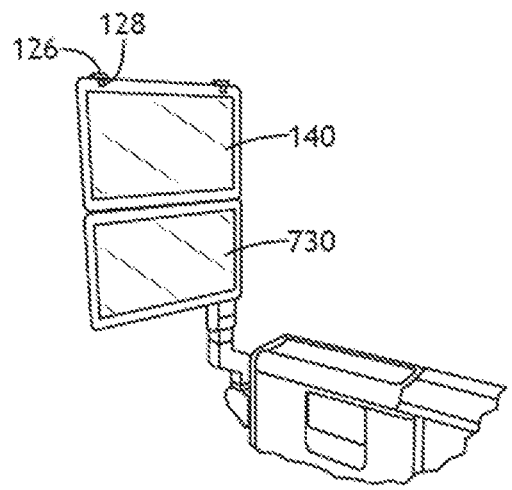

Referring now to FIGS. 7A-7C, diagrams of a PED holder within a front row video monitor associated with one embodiment of the inventive concepts disclosed herein are shown. In one embodiment of the inventive concepts disclosed herein, the retractable PED holder 102 may be incorporated with a front row personal monitor 730. One embodiment may include incorporation of the retractable PED holder 102 on an economy/premium economy/business class seating product. The front row personal monitor 730 may be fitted to rotationally stow within a plurality of locations and supported via a monitor arm 732. For example, a front row personal monitor 730 may be configured to stow via an armrest side 710 of a passenger seat. The retractable PED holder 102 may be specifically configured to incorporate with the front row personal monitor 730 to allow for continued fit within the same armrest stow location 710.

FIG. 7A may indicate a deployed front row personal monitor 730 with retractable PED holder 102 a retracted proximal with the monitor 730.

FIG. 7B may indicate the retractable PED holder 102 extended and ready for reception of the PED 140. Here, an extension direction 750 and retraction direction 752 may indicate the directions of translation of the retractable PED holder 102.

FIG. 7C may indicate the PED 140 clamped between the support shelf 126 and the front row personal monitor 730.

In one embodiment of the inventive concepts disclosed herein, the retractable PED holder 102 may be incorporated to extend not only vertically from the front row personal monitor 730 but also horizontally as well. Additionally, the retractable PED holder 102 may be specifically configured to couple and function with additional aircraft furniture. For example, a flight attendant cart may be one location the retractable PED holder 102 may couple for flight attendant use. Another example may include a retractable PED holder 102 configured to couple with a bulkhead or sidewall of an aircraft interior to offer a passenger additional function.

FIG. 8A-8E

Referring now to FIGS. 8A-8E, diagrams of a PED holder incorporated within a seat back exemplary of one embodiment of the inventive concepts disclosed herein are shown. Stowed in FIG. 8A, the retractable PED holder 102 may be configured to retract away from and maintain clear of all normal function (personal monitor 230, tray table 220, etc.) of the passenger seat 210.

Figure 8A:
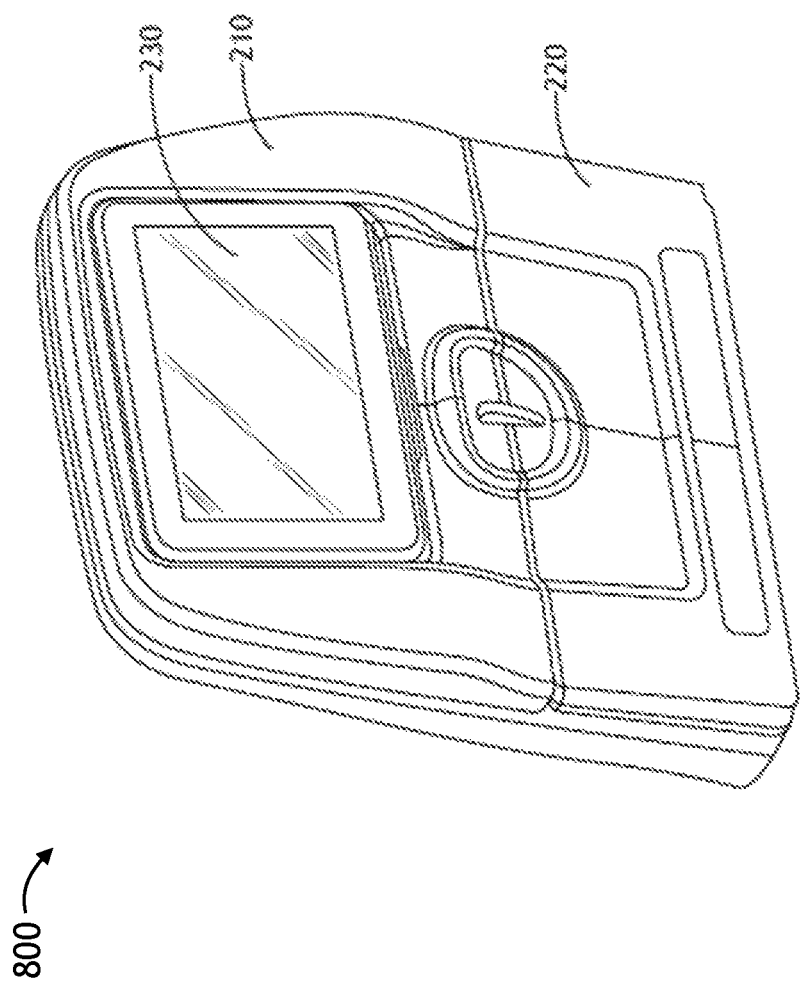
FIGS. 8A-8E are diagrams of a PED holder incorporated within a seat back exemplary of one embodiment of the inventive concepts disclosed herein.
Figure 8B:
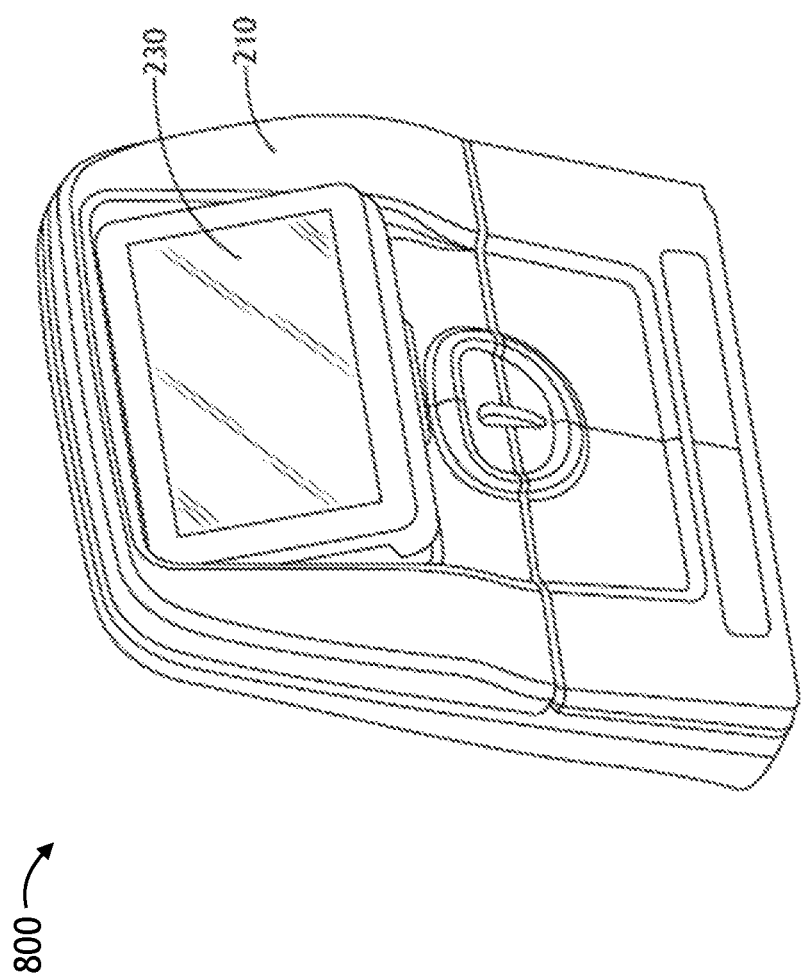
Figure 8C:
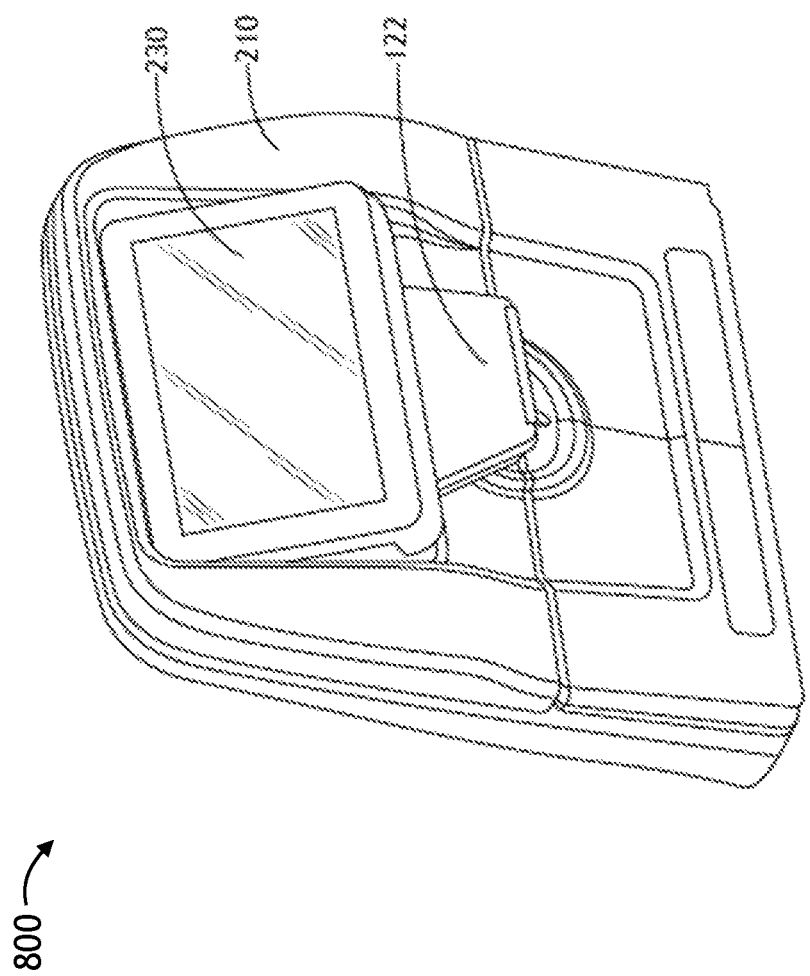

In one embodiment of the inventive concepts disclosed herein, the retractable PED holder 102 may be incorporated with the forward face of the personal monitor 230. In this manner, (as shown in FIG. 8B) the retractable PED holder 102 may mirror the tilt of the personal monitor 230. FIG. 8C may indicate the first extendable section 122 in the extended position ready to receive a PED.

Figure 8D:
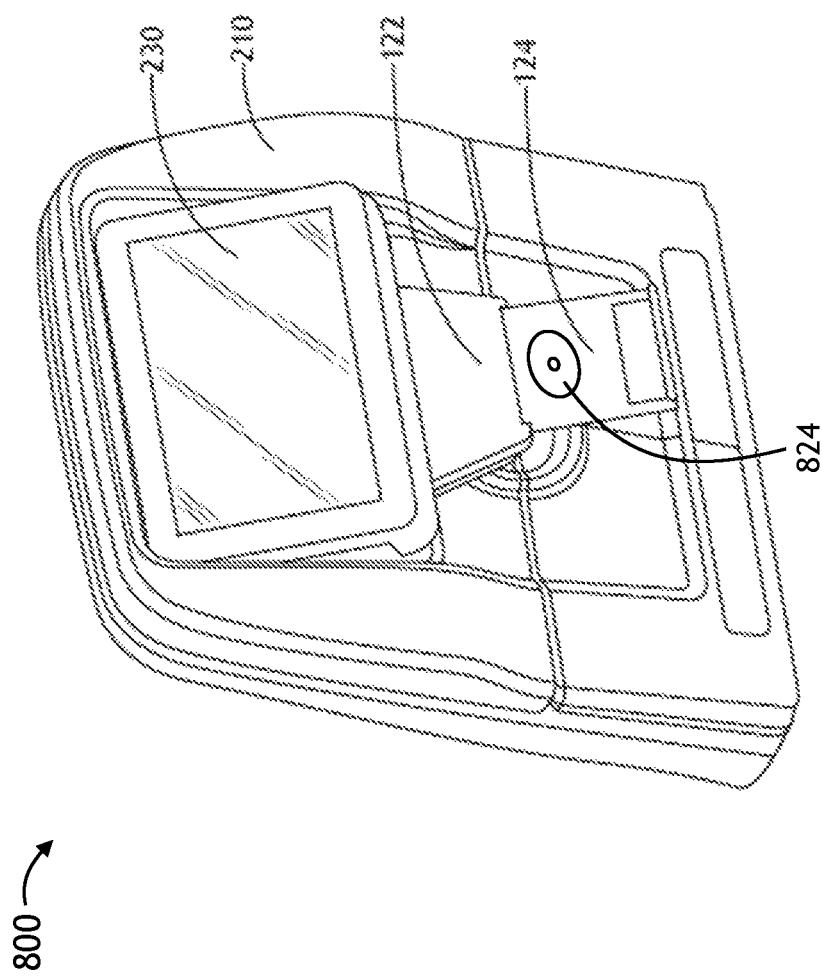

FIG. 8D may detail one embodiment of the inventive concepts disclosed herein. Here, the two-stage extendable section 120 may comprise a flat panel 122 and a tray 124. The first extendable section 122 comprises a flat panel operatively coupled to a first retraction spring 216 (FIG. 9B) coupled with the housing and the second extendable section 124 comprises a tray operatively coupled with a second retraction spring 416 (FIG. 9B) coupled with the flat panel, the flat panel extendable from the housing and the tray extendable from the flat panel.

In one embodiment of the inventive concepts disclosed herein, one or both of the first extendable section 122 and second extendable section 124 may include an induction charger 824. In this manner, the PED 140 may receive an electrical charge from the extension member 120 and may remain fully charged while mounted on the retractable PED holder 102.

Figure 8E:
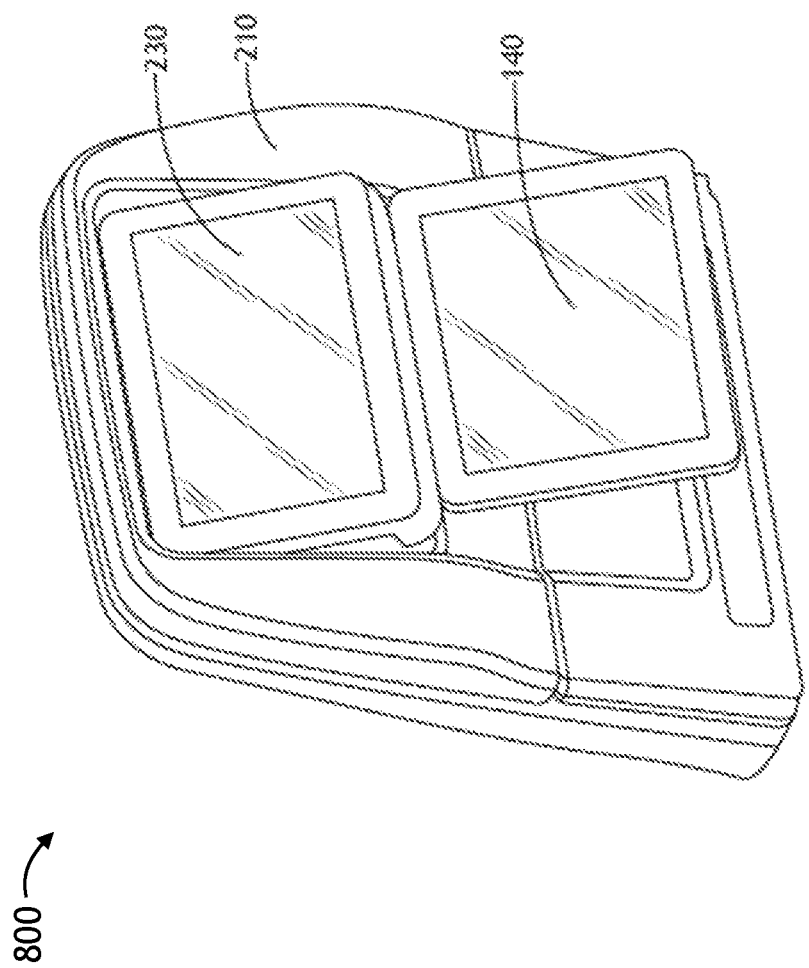

FIG. 8D may indicate both the first 122 and the second 124 extendable sections in the extended positions and ready to accept a large sized PED 140. FIG. 8E may indicate a large sized PED 140 clamped in position by the retractable PED holder 102.

In one embodiment of the inventive concepts disclosed herein, the retractable PED holder 102 may be manufactured using existing technologies, processes and materials. By utilizing off the shelf (OTS) mechanical components and traditionally manufactured components, the retractable PED holder 102 may offer an operator a low cost of production and maintenance. Further improvements may reduce weight and increase strength of each component of the retractable PED holder 102 as technologies may develop.

FIG. 9A-9B

Figure 9A:
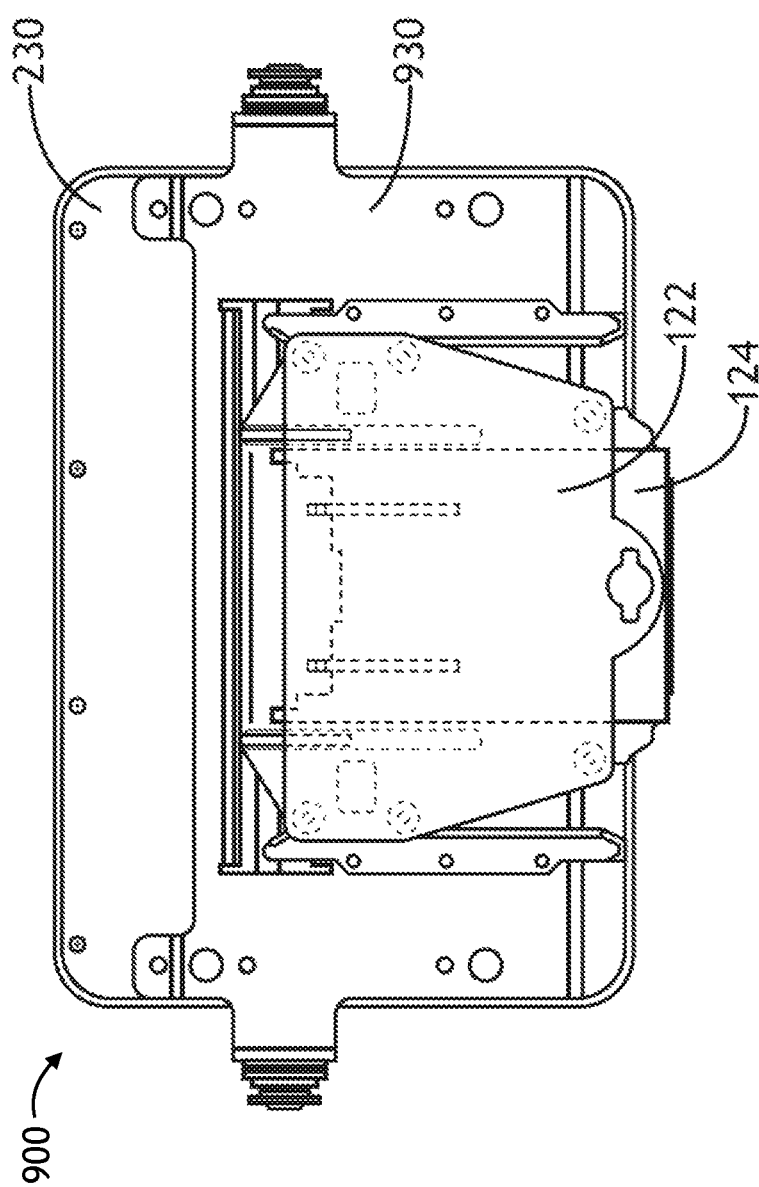
FIGS. 9A and 9B are diagrams of a retractable PED holder incorporated within a seatback monitor exemplary of one embodiment of the inventive concepts disclosed herein.
Figure 9B:
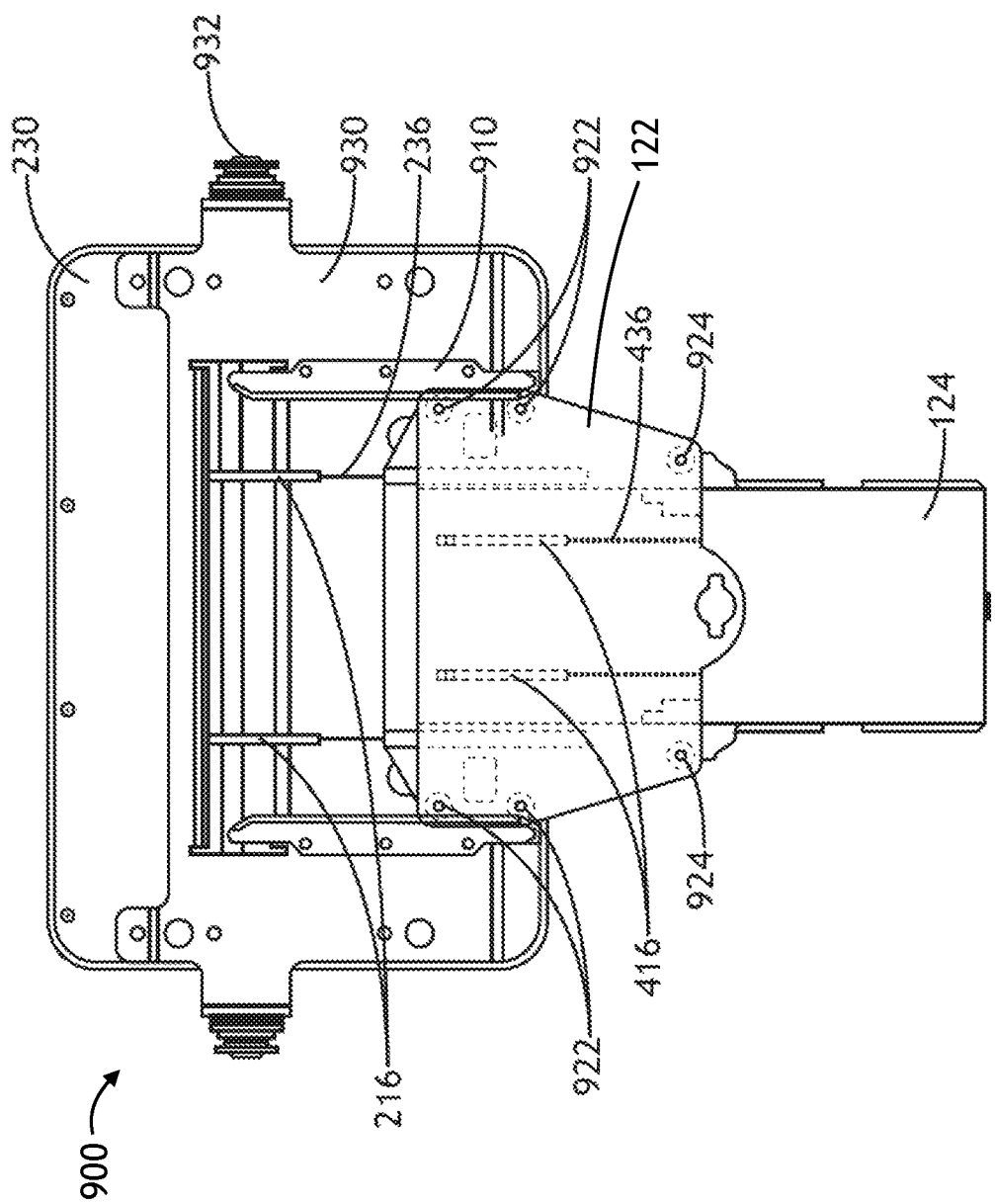

Referring now to FIGS. 9A and 9B, diagrams of a retractable PED holder incorporated within a seatback monitor are shown. FIGS. 9A and 9B are front views of the retractable PED holder 102 (e.g., from the front of an aircraft should the retractable PED holder 102 be incorporated with the passenger seat 210). FIG. 9A may indicate both the first extendable section 122 and the second extendable section 124 in the retracted position. In this exemplary embodiment, the retractable PED holder 102 is shown as incorporated with a monitor tilt bracket 930 installable within a passenger seat 210. In one embodiment, the retractable PED holder 102 may be configured to remain clear of mounting hardware associated with mounting the personal monitor 230 to the monitor tilt bracket 930. In addition, the retractable PED holder 102 may be configured to remain clear of power and data cables associated with the personal monitor 230.

FIG. 9B may detail the retractable PED holder 102 extended as incorporated with a monitor tilt bracket 930. A monitor pivot attachment 932 may function as an attachment point for the monitor tilt bracket 930 to rotationally couple with the passenger seat 210. The first extendible section 122 may couple with a first retraction spring 216 via a first spring connector 236. Similarly, the second extendible section 124 may couple with a second retraction spring 416 via a second spring connector 436. As outlined below, each spring may be configured with individual spring tension for desired results.

Each of the extendable sections 122 124 may translate via rollers. The first extendable section 122 may translationally couple with the monitor tilt bracket 930 via rails 910 and associated first rollers 922. Similarly, the second extendable section 124 may translationally couple with the first extendable section 124 via second rollers 924. It is contemplated herein, additional methods of translational coupling may be incorporated within the scope of the inventive concepts herein (e.g., slides, bearings and the like). In an additional embodiment, the points of contact between the translating elements may be coated with a non-friction coating for ease of translation.

It is contemplated herein, each retraction spring 116 216 416 may operate at an individual tension. In this manner, the operator may enable one of the two stage extendable sections having a priority of extension over the other of the extendable sections. For example, should the operator desire the second extendable section 124 be extended first, the operator may increase the spring force or increase resistance (e.g., a larger or more tightly wound spring, greater resistance within the rollers 922) applied to the first extendable section so when the passenger pulls on the support shelf, the second extendable section 124 may extend before the first 122 does. Then, as the passenger continues to pull, the first extendable section 121 may then extend.

It is further contemplated herein, each of the first 122 and second 124 extendable sections may incorporate an extension stop to limit translation in extension. For example, the passenger may apply the extension force to the support shelf or pull tab and extend the retractable PED holder 102 to the fully extended position. At the fully extended position of both sections, the mechanical stop may inhibit further translation of the retractable PED holder 102.

Also, in retraction, the retractable PED holder 102 may incorporate a friction device (e.g., a roller brake) to slow the retraction as the passenger releases the extension force. In this manner, the retractable PED holder 102 may slowly retract into the retracted position without snapping back and causing damage or pinching a passenger finger.

FIG. 10A-10C

Figure 10A:
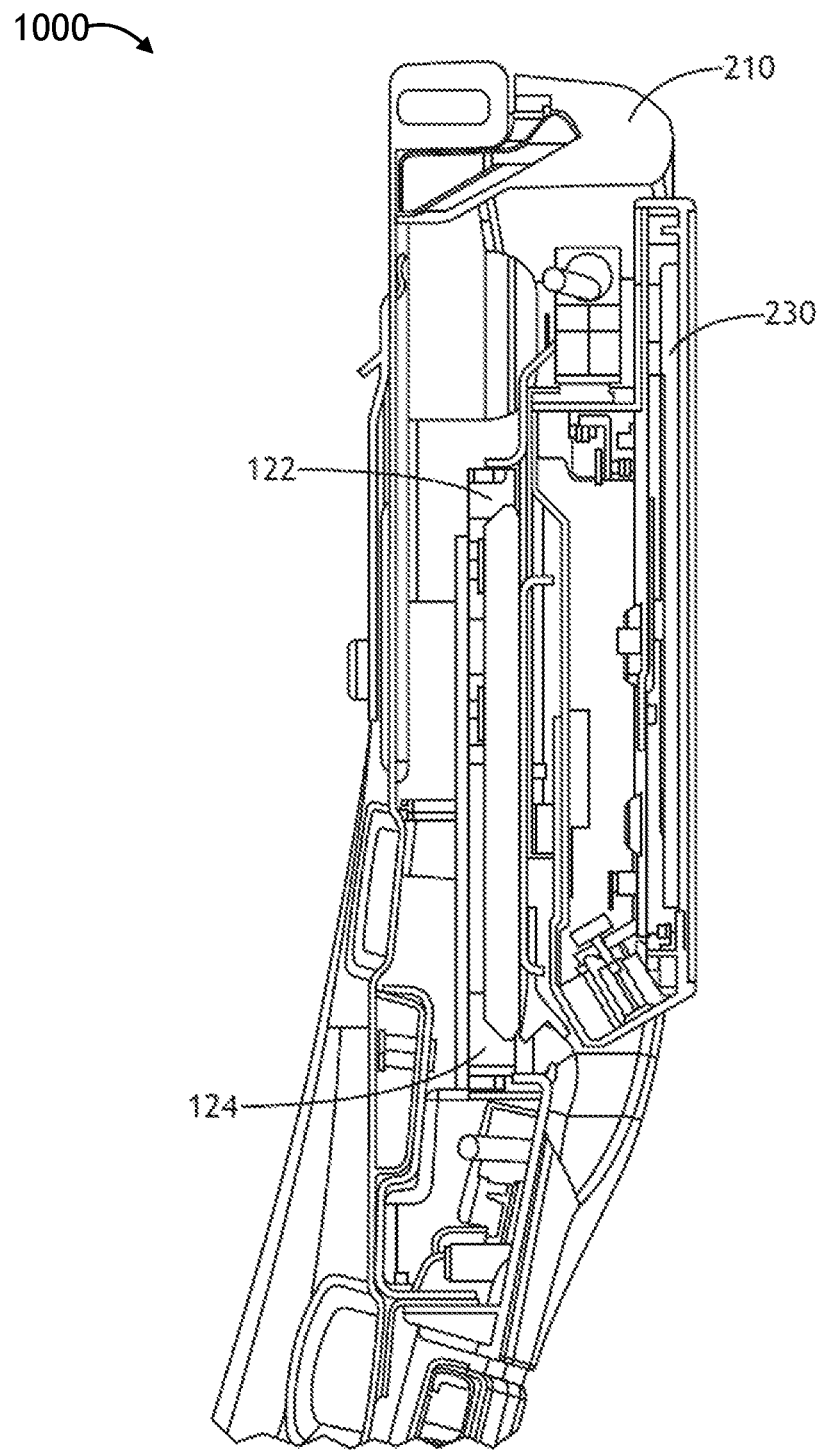
FIGS. 10A-10C are diagrams of a side view of a retractable PED holder incorporated within a seatback monitor exemplary of one embodiment of the inventive concepts disclosed herein.
Figure 10B:
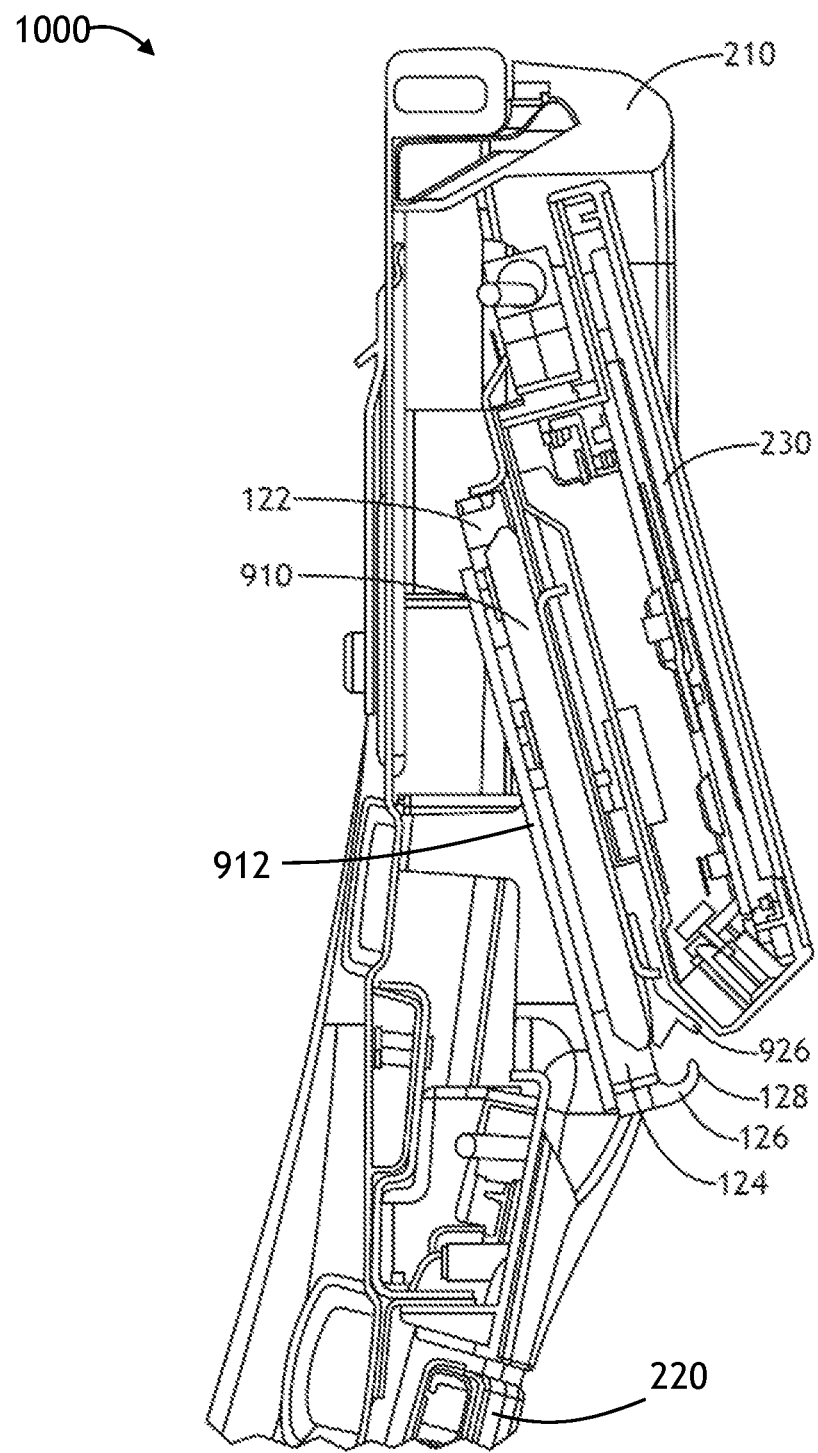
Figure 10C:
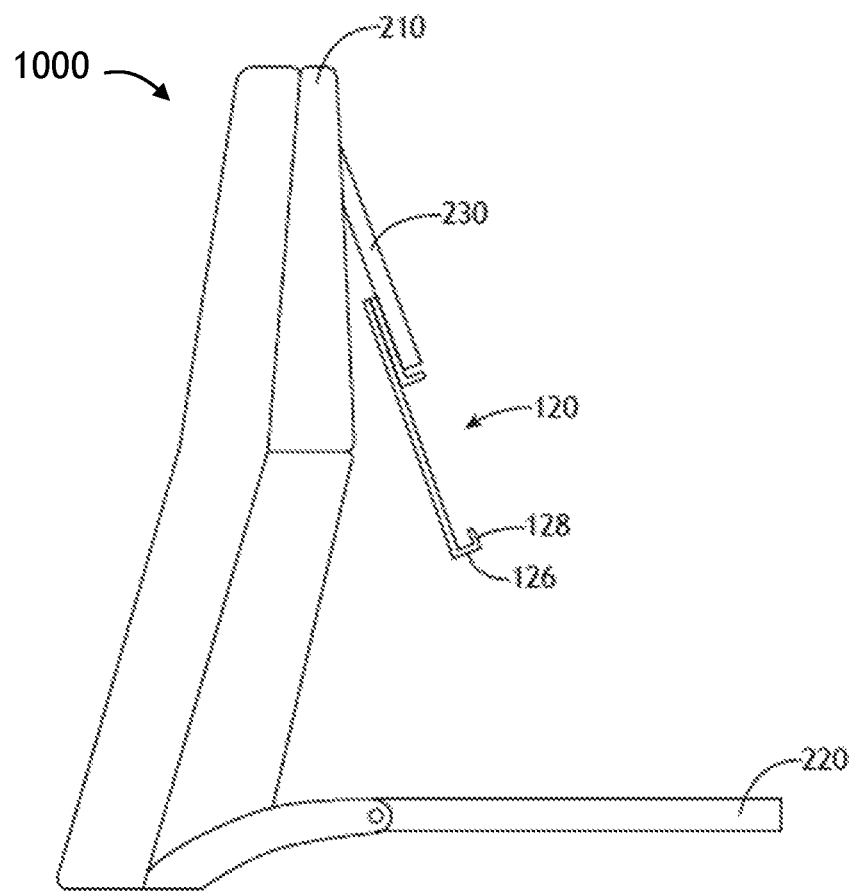
Figure 11A:
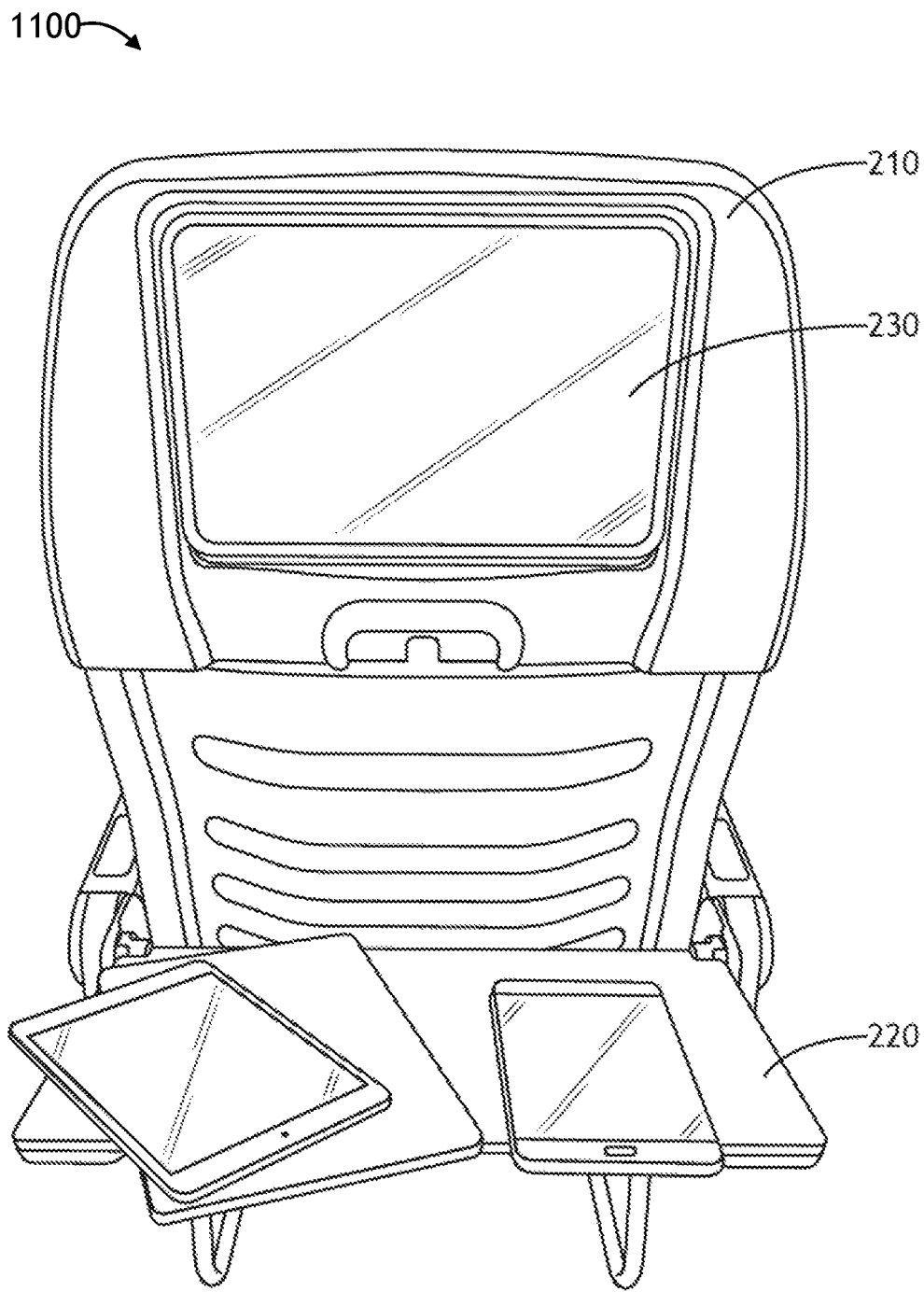
FIG. 11A-11D are rear views of a retractable PED holder incorporated within a seatback monitor exemplary of one embodiment of the inventive concepts disclosed herein.
Figure 11B:
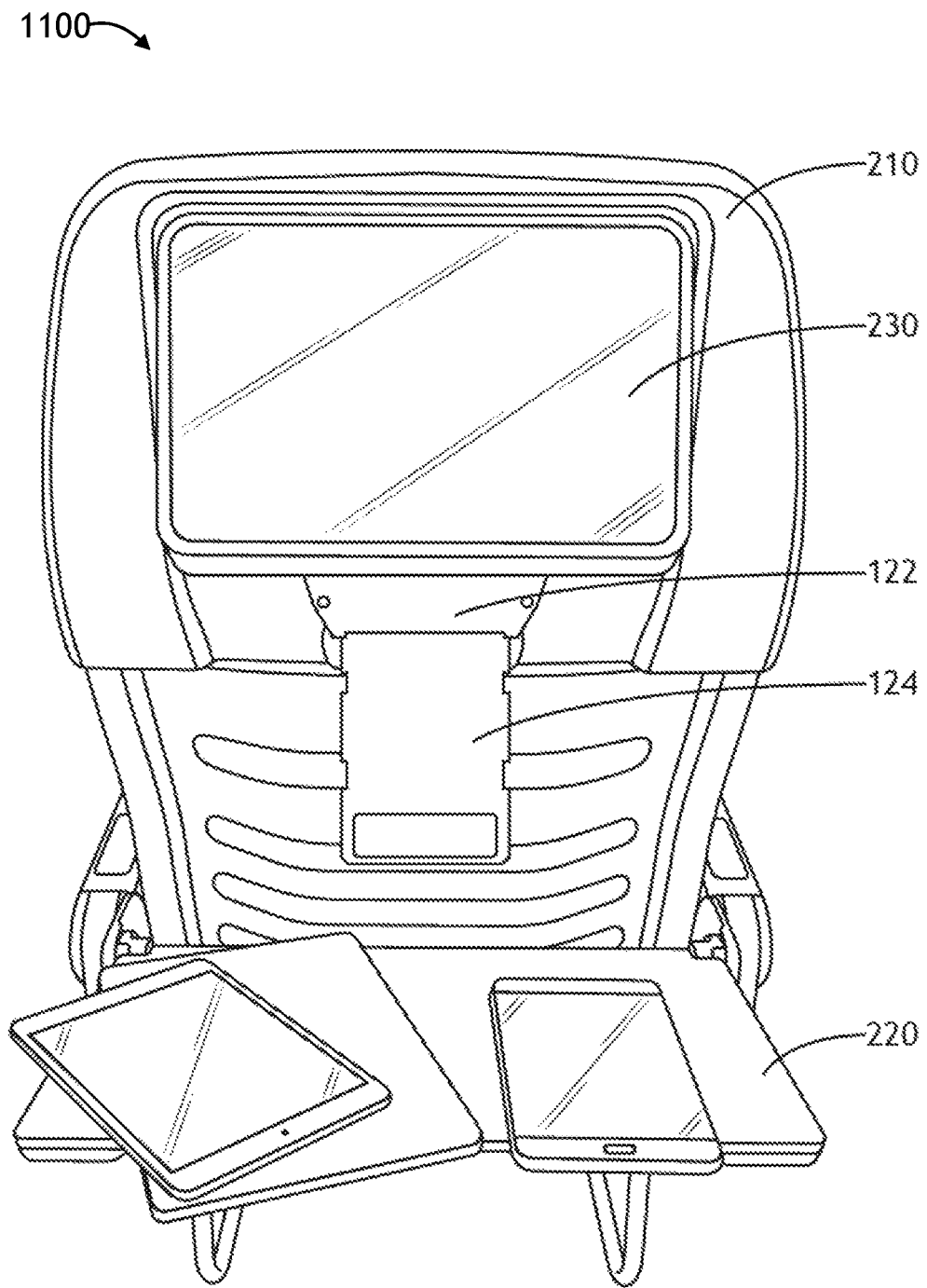
Figure 11C:
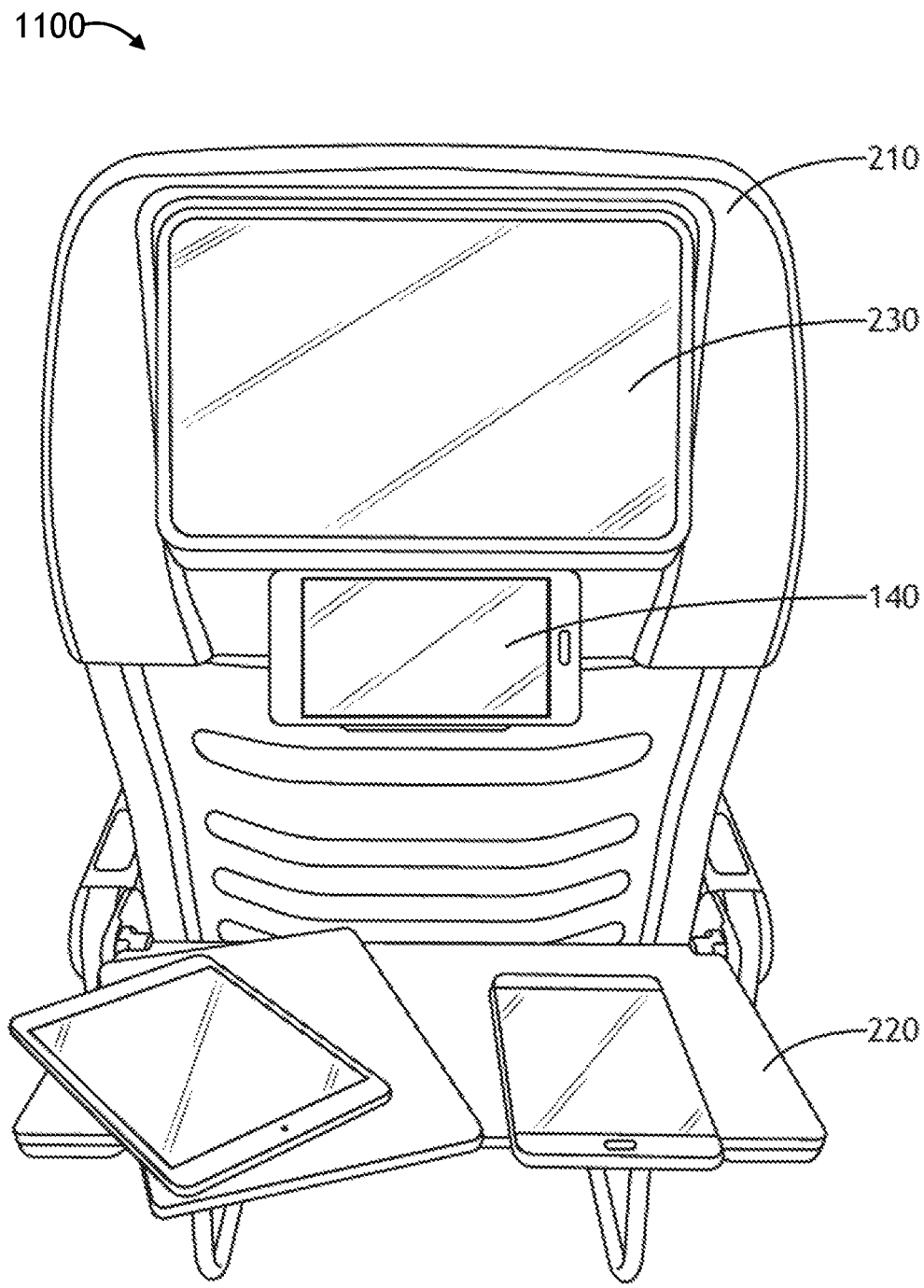
Figure 11D:
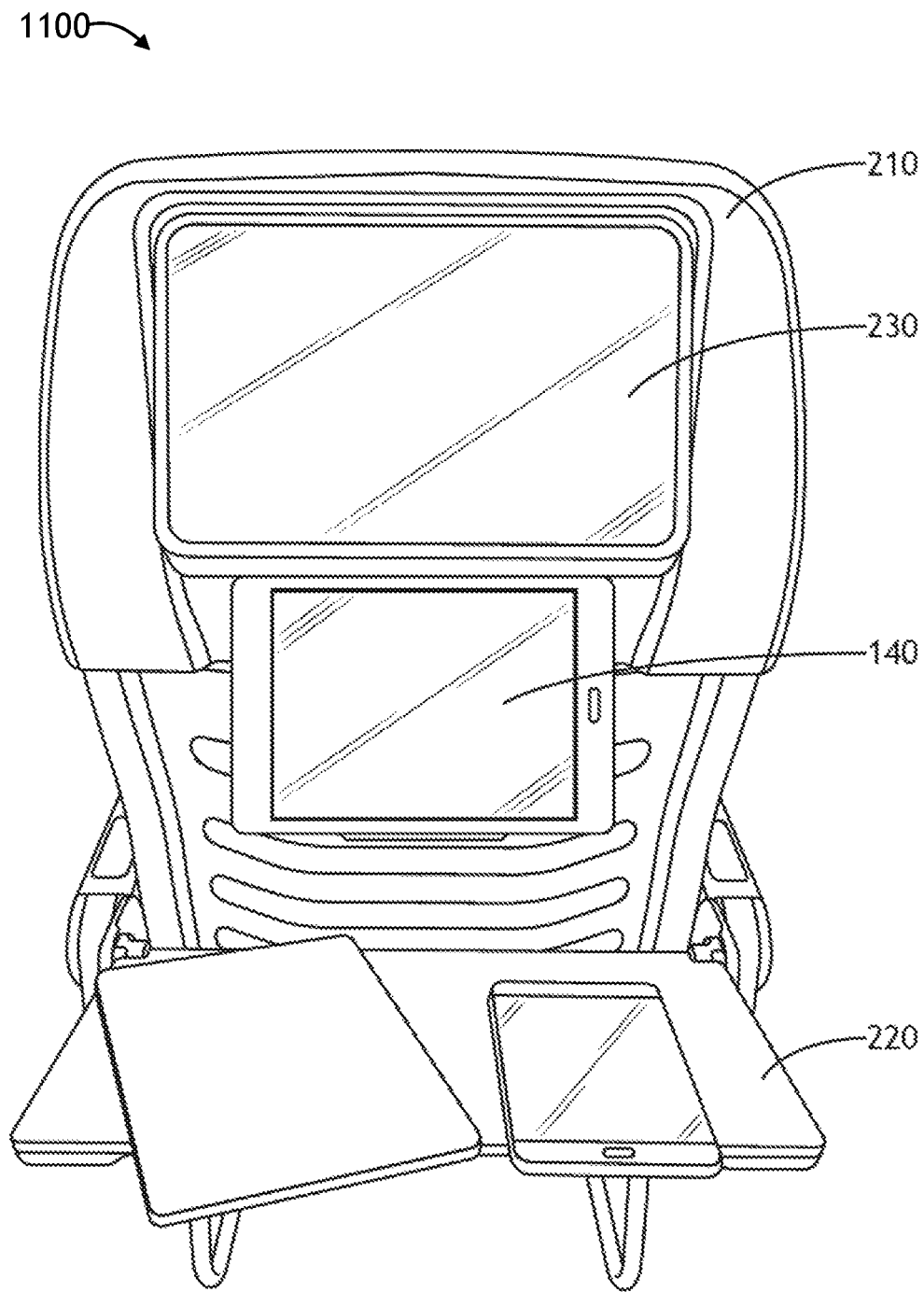

Referring now to FIGS. 10A and 10C, diagrams of a side view of a retractable PED holder incorporated within a seatback monitor are shown. In embodiments, a 0.3 inch spacer may be incorporated between the monitor tilt bracket 930 and the personal monitor 230 to create spacing to accommodate the retractable PED holder 102. FIG. 10A may indicate the retractable PED holder 102 in the retracted position while the personal monitor 230 is in a stowed position. IN one embodiment, the retractable PED holder 102 maintains a longitudinal (nose to tail of an aircraft) dimension of 0.3 inches. Rotating on the monitor pivot attachments 932, the personal monitor 230 may rotate for passenger desired view. In additional embodiments, the passenger seat 210 may be configured with depth required to include a 0.3 inch longitudinal depth added to the personal monitor cavity to accommodate the retractable PED holder 102.

FIG. 10B may indicate the personal monitor 230 rotated away from the passenger seat 210 exposing the retractable PED holder 102 for use. In one embodiment of the inventive concepts disclosed herein, the retractable PED holder 102 may maintain a maximum extension to accommodate a tablet sized PED 140.

In embodiments, additional friction devices may be incorporated with the monitor pivot attachment 932 to accommodate the additional mass of the mounted PED 140. Washer friction devices may be applied to the monitor pivot attachment 932 to aid in personal monitor 230 stability as the PED 140 is mounted.

In embodiments, a shroud 912 may function with the retractable PED holder 102 to protect the retractable PED holder 102 from damage. A second function of the shroud 912 may include passenger protection from the moving parts as the extendable section 120 translates.

FIG. 10C may indicate a simplified side view of the retractable PED holder 102 coupled with the front of the personal monitor 230 and able to extend as the personal monitor 230 is rotated out of the stowed position. In one embodiment, a retractable PED holder 102 of very little mass may be a goal of an operator. In order to minimize additional regulatory scrutiny, an operator may desire a retractable PED holder 102 with very little mass.

Also contemplated herein, the retractable PED holder 102 may include a variable support shelf 126 with its own clamping apparatus to physically clamp the distal end of the PED 140 as the PED 140 is mounted on the support shelf 126.

The retractable PED holder 102 may further include a proximal hook 926 configured to clamp the proximal end of the PED 140 in place. The proximal hook 926 may operate to protect the personal monitor 230 from damage caused by a PED 140 impacting the personal monitor 230 and to secure the proximal end of the PED 140 as the PED is mounted. In embodiments, a proximal hook 926 of variable depth may enable the retractable PED holder 102 to accommodate a PED 140 fitted with a cover. A PED 140 with attached case may fit clamped between the proximal hook 926 and the support shelf 126 to accommodate an encased PED 140.

In one embodiment of the inventive concepts disclosed herein, a vertical dimension, of the retractable PED holder 102 when fully extended, may be a maximum of approximately 11.0 inches to accommodate a large encased PED 140 between the support shelf 126 and the proximal hook 926. In this case, each of the extendible sections may maintain a vertical dimension of approximately 5.5 inches.

In additional embodiments, the size of the retractable PED holder 102 may be proportional with a size of the personal monitor 230. For example, a 10.0 inches personal monitor 230 may approximate a vertical dimension of 7.0 inches while a 9.0 inches personal monitor 230 may approximate a vertical dimension of 5.5 inches. Each of these sized of personal monitors 230 may accommodate a retractable PED holder 102 with a vertical dimension of 5.0 inches with an approximate extension dimension of 10.0 inches. It is contemplated herein, the retractable PED holder 102 may be limited in size only by the vertical dimension of the furniture to which the retractable PED holder 102 is associated. An extension member 120 of a dimension limited only by structural strength of the materials and the size of the associated furniture may fall within the scope of this concept.

FIG. 11A-11D

Referring now to FIGS. 11A-11D, rear views of a retractable PED holder incorporated within a seatback monitor is shown. Generally, FIGS. 11A through 11D indicate a rear view of the retractable PED holder 102 as various sizes of PED 140 are mounted within the retractable PED holder 102.

FIG. 12

Referring now to FIG. 12, a flowchart of a method for retractably receiving a PED is shown. A step 1202 may include mounting a support structure one of: within a seat back and a on seat back monitor, the support structure including a housing and a mounting assembly, the housing including a retraction spring.

A step 1204 may include coupling an extension member with the housing, the extension member 1) translationally coupled with the housing, 2) operatively coupled with the retraction spring, and 3) biased for retraction proximal to the housing, the retraction spring causing the retraction bias, the extension member including a support shelf attached to an end of the extension member distant from the housing, the support shelf configured to clamp the PED between the support shelf and the housing.

A step 1206 may include wherein the housing is configured to translationally receive the extension member.

Conclusion

As will be appreciated from the above, an apparatus for retractably receiving a Portable Electronic Device (PED) according to embodiments of the inventive concepts disclosed herein may have additional novel function over currently used products.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An apparatus for retractably receiving a Portable Electronic Device (PED), comprising:
a support structure configured for integrating with one of: a seat back and a passenger monitor, the support structure including a housing and a mounting assembly, the housing including a retraction spring;
an extension member translationally coupled with the housing and biased for retraction proximal to the housing, the extension member configured for retraction proximal with the housing and operatively coupled with the retraction spring, the retraction spring causing the retraction bias, the extension member including a support shelf attached to an end of the extension member distant from the housing, the support shelf configured to clamp the PED between the support shelf and the housing, wherein the extension member further comprises a two stage extension member including a first extendable section and a second extendable section, the first extendable section translationally coupled with the housing and the second extendable section translationally coupled with the first extendable section and the retraction spring, the second extendable section includes the support shelf, the first and second extendable sections configured for retraction proximally with, and extension distally from, the housing.

2. The apparatus for retractably receiving a PED of claim 1, wherein the first extendable section comprises a flat panel operatively coupled to a first retraction spring proximal with the housing and the second extendable section comprises a tray operatively coupled with a second retraction spring associated with the flat panel, the flat panel extendable from the housing and the tray extendable from the flat panel.

3. The apparatus for retractably receiving a PED of claim 1, wherein the first extendable section comprises a first pair of retractable arms translationally coupled with the support structure and the second extendable section comprises a second pair of retractable arms translationally coupled to the first pair, each single arm of the second pair of retractable arms including the support shelf.

4. The apparatus for retractably receiving a PED of claim 1, wherein each of the seat back and passenger monitor are parts of an aircraft furniture, and wherein the apparatus for retractably receiving a PED is configured for retraction allowing operation of a proximal single piece tray table coupled with the seat back.

5. The apparatus for retractably receiving a PED of claim 3, further including a cross member mounted between the first pair of retractable arms.

6. The apparatus for retractably receiving a PED of claim 1, further including an indicator tab for passenger extension of the extension member.

7. The apparatus for retractably receiving a PED of claim 1, wherein the housing is one of; cylindrical or tracked and the extension member is one of: cylindrical or tracked, for mating with the housing.

8. The apparatus for retractably receiving a PED of claim 1, wherein the PED holder extension member is coated with a non-friction surface.

9. A method for retractably receiving a PED, comprising:
mounting a support structure one of: proximal with a seat back and on a seat back monitor, the support structure including a housing and a mounting assembly, the housing including a retraction spring; and coupling an extension member with the housing, the extension member 1) translationally coupled with the housing, 2) operatively coupled with the retraction spring, and 3) biased for retraction proximal to the housing, the retraction spring causing the retraction bias, the extension member including a support shelf attached to an end of the extension member distant from the housing, the support shelf configured to clamp the PED between the support shelf and the housing; wherein the housing is configured to translationally receive the extension member, the extension member operatively coupled with the retraction spring further includes coupling at least one first spring of the retraction spring with a first extendable section and coupling at least one second spring of the retraction spring with a second extendable section.

10. The method for retractably receiving a PED of claim 9, wherein mounting a support structure one of: within a seat back and a on seat back monitor further includes integrating the support structure with the seat back and seat back monitor as parts of an aircraft furniture.

11. The method for retractably receiving a PED of claim 9, further including coating the extension member with a non-friction surface.

12. A method for retractably receiving a PED, comprising:

mounting a support structure one of: proximal with a seat back and on a seat back monitor, the support structure including a housing and a mounting assembly, the housing including a retraction spring; and coupling an extension member with the housing, the extension member 1) translationally coupled with the housing, 2) operatively coupled with the retraction spring, and 3) biased for retraction proximal to the housing, the retraction spring causing the retraction bias, the extension member including a support shelf attached to an end of the extension member distant from the housing, the support shelf configured to clamp the PED between the support shelf and the housing; wherein the housing is configured to translationally receive the extension member, wherein the extension member translationally coupled with the housing further includes coupling one of: a single extension member and a two-stage extension member with the housing.

* * * * *